US010354166B2

(12) United States Patent
Nahum et al.

(10) Patent No.: US 10,354,166 B2
(45) Date of Patent: Jul. 16, 2019

(54) READING TEST CARDS USING A MOBILE DEVICE

(71) Applicant: Bio-Rad Laboratories (Israel), Inc., Rishon Lezion (IL)

(72) Inventors: Guy Nahum, Risho le Zion (IL); Nir Broer, Ramat Gan (IL); Amit Oved, Givatyim (IL); Rivka Monitz, Nir Zevi (IL)

(73) Assignee: Bio-Rad Laboratories (Israel) Inc., Rishon Lezion (IL)

( * ) Notice: Subject to any disclaimer, the term of this patent is extended or adjusted under 35 U.S.C. 154(b) by 57 days.

(21) Appl. No.: 15/601,675

(22) Filed: May 22, 2017

(65) Prior Publication Data

US 2018/0336433 A1    Nov. 22, 2018

(51) Int. Cl.
| | |
|---|---|
| *G06K 9/00* | (2006.01) |
| *G06K 9/62* | (2006.01) |
| *G06K 9/46* | (2006.01) |
| *G06K 9/03* | (2006.01) |
| *G06K 9/22* | (2006.01) |
| *G06K 9/32* | (2006.01) |
| G06K 9/36 | (2006.01) |

(52) U.S. Cl.
CPC ........... *G06K 9/6215* (2013.01); *G06K 9/036* (2013.01); *G06K 9/228* (2013.01); *G06K 9/3208* (2013.01); *G06K 9/3216* (2013.01); *G06K 9/4671* (2013.01); G06K 2009/363 (2013.01)

(58) Field of Classification Search
None
See application file for complete search history.

(56) References Cited

U.S. PATENT DOCUMENTS

| 8,889,424 | B2 | 11/2014 | Ehrenkranz et al. | |
|---|---|---|---|---|
| 9,322,767 | B2 | 4/2016 | Ehrenkranz | |
| 9,478,099 | B2* | 10/2016 | Czyzewski | G07F 17/3225 |
| 2002/0044677 | A1* | 4/2002 | Fox | G06K 9/00 |
| | | | | 382/135 |
| 2009/0324053 | A1* | 12/2009 | Ross | G06K 9/2018 |
| | | | | 382/137 |
| 2015/0160245 | A1* | 6/2015 | Lieberman | G01N 33/523 |
| | | | | 506/12 |
| 2015/0304555 | A1 | 10/2015 | Ehrenkranz | |

(Continued)

FOREIGN PATENT DOCUMENTS

JP    H06-319025 A    11/1994

OTHER PUBLICATIONS

Tonn, S., "Rethinking One of Medicine's Trusty Staples: The Urinary Dipstick," Stanford Engineering, May 17, 2016, pages, [Online] [Retrieved on Jul. 18, 2017], Retrieved from the Internet<URL:https://engineering.stanford.edu/news/rethinking-one-medicine-s-trusty-staples-urinary-dipstick?utm_source=SoEnewsletter&utm_medium=email&utm_campaign=Sep22016&utm_content=dipstick51716.

(Continued)

*Primary Examiner* — Hadi Akhavannik
(74) *Attorney, Agent, or Firm* — Fenwick & West LLP

(57) ABSTRACT

An input image is received from a mobile device. A portion of the input image is determined to correspond to a test card and an image transformation is applied to that portion of the input image. The image transformation rectifies the portion of the input image. Based on the rectified image, a specific test for which the test card includes a result and the result of that test are both identified.

23 Claims, 6 Drawing Sheets

(56) References Cited

U.S. PATENT DOCUMENTS

2015/0317533 A1* 11/2015 Eid .......................... G06K 9/18
382/203

OTHER PUBLICATIONS

PCT Invitation to Pay Additional Fees, PCT Application No. PCT/IL2018/050548, dated Jul. 5, 2018, 16 pages.
Banerjee, S. et al., "Visual Recognition of Paper Analytical Device Images for Detection of Falsified Pharmaceuticals," Cornel University Library, arXiv.1704.04251v1, Apr. 13, 2017, pp. 1-10.

* cited by examiner

READING TEST CARDS USING A MOBILE DEVICE

BACKGROUND

1. Technical Field

The subject matter described herein generally relates to diagnostic testing, and in particular to reading results of such tests using the camera of a mobile device.

2. Background Information

Many medical tests produce results in the form of test cards. The precise markings on these test cards indicate the specific results of the test or tests conducted, providing information to medical professionals to assist in the diagnosis of various conditions. Existing techniques involve medical professionals either manually interpreting test cards or processing them at a dedicated test station. In many cases, the test stations are limited in number and may be located a considerable distance from the corresponding patient. In some instances, a test station may be temporarily not working, or one may not be available at all.

SUMMARY

The above and other problems are addressed by computing devices and methods for reading test cards using images captured by a mobile device, according to various embodiments. In one embodiment, the computing device reads test cards by obtaining an input image including the test card from a mobile device. The computing device determines whether the image (or a portion thereof) includes a test card and, if so, applies an image transformation to rectify the input image (e.g., to correct for skew, differences in size between images, and the like). The computing device also identifies both a specific test for which the test card includes a result and the result of that test based on the rectified input image. In one embodiment of the method, the test card is read substantially as described above with regard to the computing device. Embodiments of a system that includes both a mobile device and a diagnostic server that operate together to read test cards are also disclosed.

DETAILED DESCRIPTION

The presence of mobile devices has become almost ubiquitous. A vast majority of people now carry at least one in a bag or pocket most of the time. The computing power of these devices has consistently increased as well, increasing the range of functionality they can provide. Consequently, mobile devices are an under-utilized resource in many contexts. One such context is the reading of medical test cards. Enabling medical professionals to easily obtain results using their own mobile device can reduce the time required to obtain results. This can also provide results in scenarios where dedicated test card readers are unavailable, either due to failure or lack of proximity. For example, a mobile device can be used to read test cards at a patient's home or the scene of a medical emergency, potentially many miles from the nearest hospital equipped with a dedicated reader.

The Figures (FIGS.) and the following description describe certain embodiments by way of illustration only. One skilled in the art will readily recognize from the following description that alternative embodiments of the structures and methods illustrated herein may be employed without departing from the principles described. Reference will now be made to several embodiments, examples of which are illustrated in the accompanying figures. It is noted that wherever practicable similar or like reference numbers may be used in the figures and may indicate similar or like functionality.

System Overview

Figure 1:
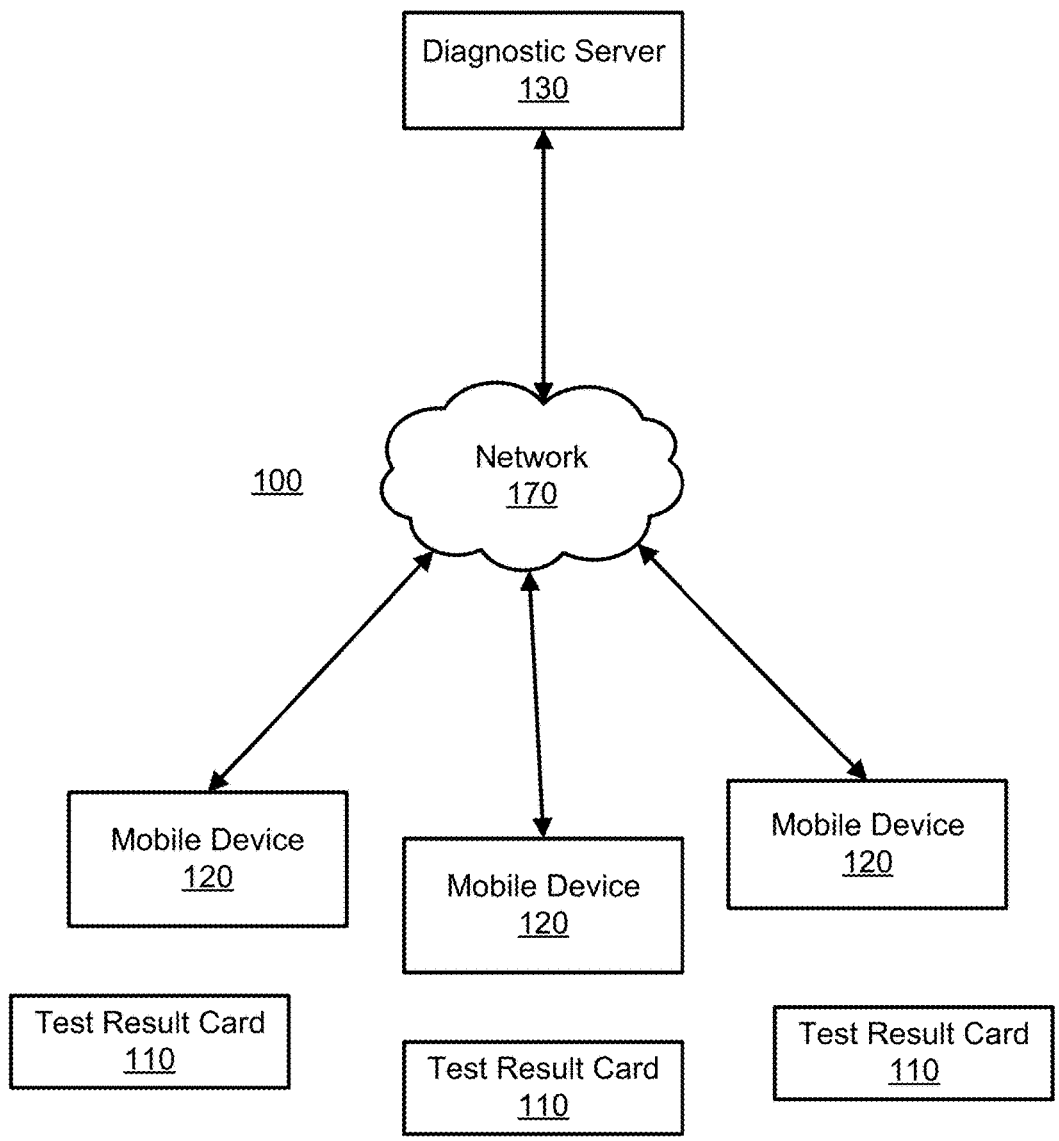
FIG. 1 is a high-level block diagram of a system suitable for reading a test card using a mobile device, according to one embodiment.

FIG. 1 illustrates one embodiment of a system 100 suitable for reading a test card 110 using a mobile device 120. As shown, the system 100 includes one or more mobile devices 120 connected to a diagnostic server 130 via a network 170. Other embodiments of the system 100 include different or additional components. In addition, the functions may be distributed among the components in a different manner than described. For example, in various embodiments, some or all of the processing attributed to the diagnostic server 130 is performed locally on the mobile device 120. In embodiments where all of the processing is performed locally, the diagnostics server 130 and network 170 may be omitted entirely.

A test card 110 is a visual record of the result of a diagnostic test. FIG. 1 shows three tests cards 110 for illustrative purposes. However, in practice, any number of test cards may be present in the proximity of mobile devices 120 at any given time. Although the term "card" is used, this should not be taken to limit the structure of a test card 110. In various embodiments, test cards 110 include printed documents, cartridges, cassettes, test kits, gel cards, and the like. In one embodiment, the test cards 110 include TOX/SEE™ urine testing panels, GEENIUS™ HIV test kits, and ID-SYSTEM™ gel cards. One of skill in the art will recognize other test cards 110 that may be read by the system 100 without deviating from the principles or scope of this disclosure.

In various embodiments, the mobile devices 120 are devices carried or worn by users that include a camera, such as smartphones, tablets, personal digital assistants, MP3 players, smartwatches, smartglasses, safety glasses with an attached camera, head-mounted cameras, and the like. Dedicated mobile test readers that are designed to provide the described function of the mobile devices 120 may also be used instead of or in addition to other types of mobile device. Although three mobile devices 120 are shown in FIG. 1 for illustrative purposes, in practice, the system 100 can include any number of mobile devices. In one embodiment, users (e.g., medical professionals) install an application ("app") on their own mobile devices 120, which provides the described functionality.

In one embodiment, a user captures an image of a test card 110 using a mobile device 120. The image can be captured without using any special mounting equipment or otherwise preparing the test card prior to image capture. The image is then sent to the diagnostic server 130 (e.g., via network 170). The diagnostic server 130 analyzes the image to determine the test results indicated by the test card 110. Embodiments of the diagnostic server 130 are described in greater detail below, with reference to FIG. 4.

Referring back to FIG. 1, once the image has been analyzed, the diagnostic server 130 sends the test results to the mobile device 120 (e.g., via network 170), which displays them to the user. Thus, the user can use a mobile device 120 to ascertain the test results indicated by a test card 110. By using a mobile device 120 that the user was likely already carrying, the test results can be obtained conveniently and cheaply, relative to systems that rely on specialized image-capture equipment (e.g., scanning stations, device attachments for mounting test cards, etc.). Embodiments of the mobile device 120 are described in greater detail below, with reference to FIG. 3.

Referring again to FIG. 1, the network 170 enables the components of the system 100 to communicate with each other. In one embodiment, the network 170 uses standard communications technologies and/or protocols and can include the Internet. Thus, the network 170 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 170 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 170 can use custom and/or dedicated data communications technologies instead of, or in addition to, the ones described above.

Figure 2:
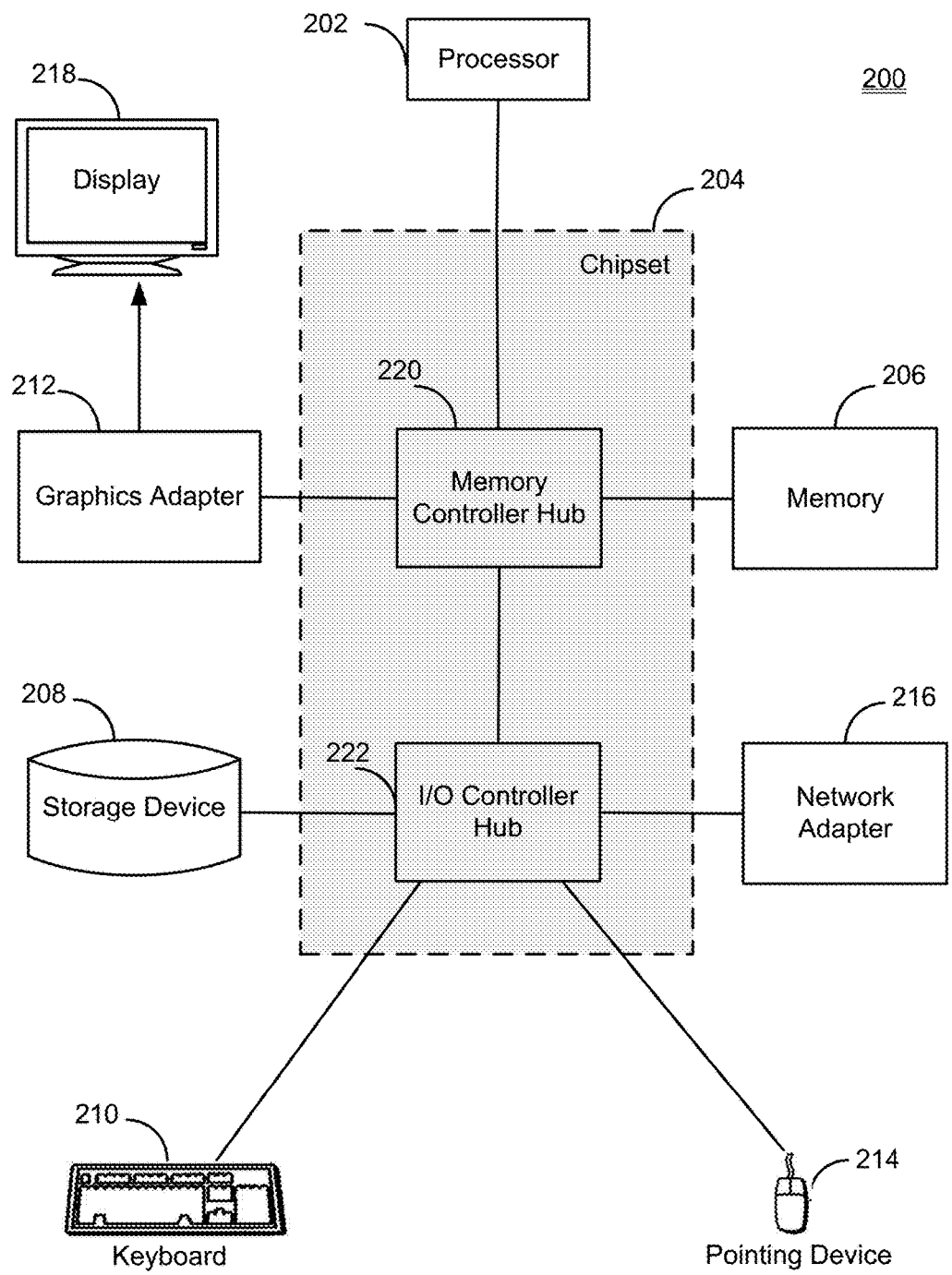
FIG. 2 is a high-level block diagram illustrating an example of a computer for use in the system of FIG. 1, according to one embodiment.

FIG. 2 is a high-level block diagram illustrating one embodiment of a computer 200 suitable for use in the system 100. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different or additional components than those shown in FIG. 2. For example, the diagnostic server 130 can be formed of multiple computers 200 operating together to provide the functions described. As another example, the mobile device 120 can be a smartphone and include a touchscreen that provides on-screen keyboard 210 and pointing device 214 functionality.

The computer 200 is adapted to execute computer program modules for providing functionality described herein. As used herein, the term "module" refers to computer program instructions or other logic used to provide the specified functionality. Thus, a module can be implemented in hardware, firmware, or software, or a combination thereof. In one embodiment, program modules formed of executable computer program instructions are stored on the storage device 208, loaded into the memory 206, and executed by the processor 202.

Example Systems

Figure 3:
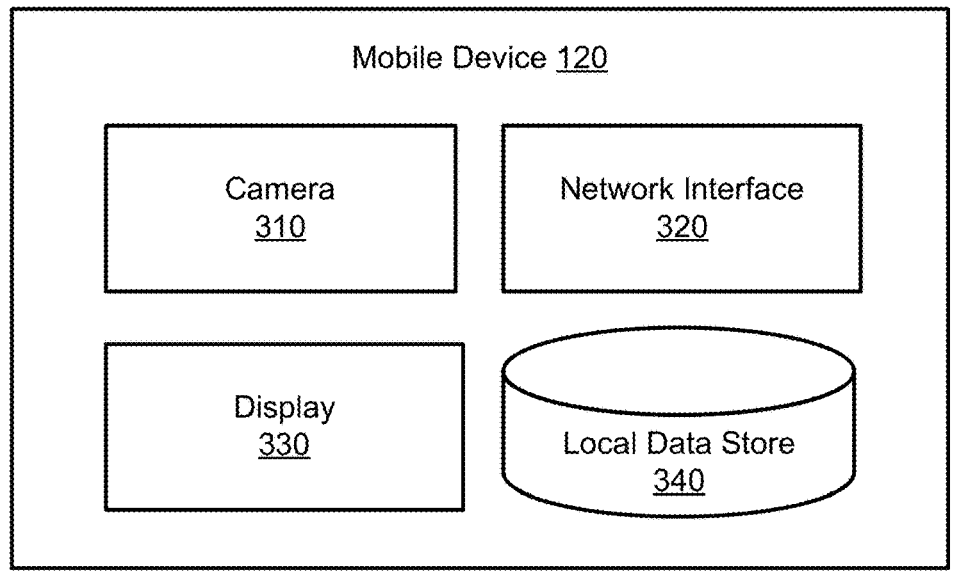
FIG. 3 is a high-level block diagram illustrating one embodiment of the mobile device shown in FIG. 1.

FIG. 3 illustrates one embodiment of the mobile device 120. As shown, the mobile device 120 includes a camera 310, a network interface 320, a display 330, and a local data store 340. Other embodiments of the mobile device 120 include different or additional components. For example, in embodiments where image processing and analysis is performed locally by the mobile device 120, the network interface 320 might be omitted.

The camera 310 captures images of the surroundings of the mobile device 120. In some embodiments, the user launches a test card reader app, which prompts the user to take a photograph that includes a test card 110. Alternatively, the user might take the photograph of the test card using a camera app and then select the photograph to be analyzed (e.g., by loading it in a test card reading app). In one embodiment, where the mobile device 120 includes a flash, the camera 310 automatically uses the flash if the overall brightness detected by the camera (or another sensor) is below a threshold. In another embodiment, the user may select whether the flash should be used (e.g., using controls provided on the display 330). Although the mobile device 120 is shown as having only a single camera 310, one of skill in the art will recognize that mobile devices can have multiple cameras. For example, many smartphones have both front and rear facing cameras. When using such mobile devices 120, the user may be provided with controls (e.g., an on-screen button) to select between the available cameras.

The network interface 320 couples the mobile device 120 to the network 170. The network interface 320 transmits outgoing data (e.g., images captured by the camera 310) over the network 170 and receives incoming data (e.g., results read from an image of a test card). Received data is then routed to the appropriate component or components of the mobile device 120 (e.g., a test card reader app). In various embodiments, the network interface 320 includes one or more of: a Wi-Fi network connection (e.g., using an 802.11 based protocol), a mobile data connection (e.g., using 3G, 4G, 4G-LTE, or the like), or a Bluetooth™ connection. In some embodiments where multiple network connections are available, the mobile device 120 provides controls (e.g., on a display 330) enabling the user to select which one to use. In other embodiments, the connection is selected automatically (e.g., based on the strength of the connections and/or the corresponding network speeds). One of skill in the art will recognize other types of network connection that may be used.

The display 330 presents information to the user, such as instructions on how to obtain an appropriate image of a test card and the results obtained by analyzing an image of a test card. In one embodiment, the display 330 is a touchscreen. The test card reader app presents a user interface for obtaining images on the display 330. For example, the display 330 might present an instruction telling the user to take a photograph of a test card. The user then taps on a control to open a camera interface that displays a preview of what is currently being obtained by the camera 310. On selection of another control (or the same control a second time), an image is captured.

In one embodiment, once an image is captured, it is presented to the user on the display 330 for review. The display 330 also includes a pair of controls, one to submit the image for analysis and the other to discard the image and capture another. If the user selects the submit control, the image is sent to the diagnostic server 130 for analysis (or sent to an analysis component of the mobile device 120, in embodiments where the analysis is performed locally). In contrast, if the user selects the discard control, the camera preview is displayed again and the user can capture a new image.

The local data store 340 includes one or more computer-readable storage media (e.g., hard drives, flash memory, etc.) that store software and data used as part of the test card reading process. In one embodiment, the local data store 340 stores the test card reader app, the images captured by the camera 310, and test results received from the diagnostic server 130. Images and test results can be encrypted and/or deleted a short time after use to protect against unauthorized access and copying. In other embodiments, some or all of this content is located elsewhere (e.g., at the diagnostic server 130 or a cloud storage facility) and accessed via the network 170.

Figure 4:
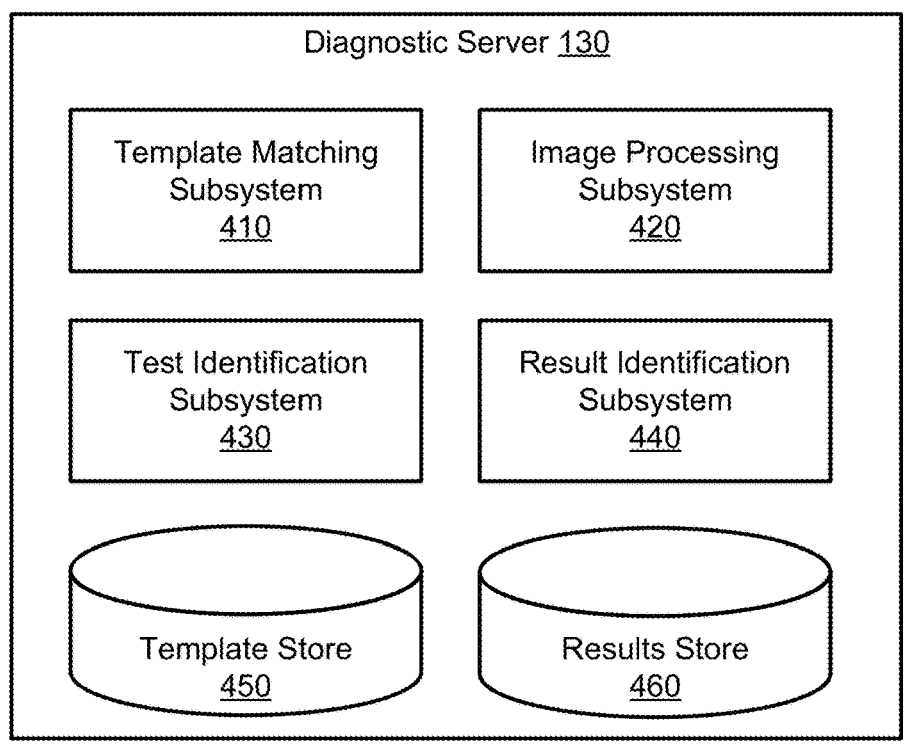
FIG. 4 is a high-level block diagram illustrating one embodiment of the diagnostic server shown in FIG. 1.

FIG. 4 illustrates one embodiment of the diagnostic server 130. As shown, the diagnostic server 130 includes a template matching subsystem 410, an image processing subsystem 420, a test identification subsystem 430, a result identification subsystem 440, a template store 450, and a results store 460. Other embodiments of the diagnostic server 130 include different or additional components. In addition, the functions may be distributed among the components in a different manner than described. For example, although the template store 450 and the results store 460 are shown as separate components, the corresponding functionality may be provided by a single data store. As another example, the results store 460 may be omitted, with results being stored either in a remote database or on the mobile device 120 from which the image was received.

The template matching subsystem 410 compares a captured image to one or more templates to determine whether a test card is present. In various embodiments, templates identify features that are common to a particular class of gel card. For example, one class of gel card might include six adjacent sample containers with various boxes beneath for text (e.g., identifying particular tests corresponding to each container and the results). Consequently, the corresponding template might identify each of these features and their relative locations when viewed along the normal of the plane of the test card (i.e., "head-on").

In one embodiment, the template matching subsystem 410 receives an image (e.g., captured by a camera 310 of a mobile device 120) and an indication of which class of test card is expected to be present. This indication can be hard-coded (for systems designed to be used with a single class of test card) or received along with the image (e.g., based on a user selection). The template matching subsystem 410 applies a feature recognition algorithm to generate matching data (e.g., indications of areas of interest in the image predicted to correspond to features in the template and a probability that the image includes a test card of the expected class). Examples of such algorithms include: Scale-Invariant Feature Transform (SIFT), Fast Retina Keypoint (FREAK), Binary Robust Invariant Scalable Keypoints (BRISK), and Oriented FAST and Rotated BRIEF (ORB). A common feature of these algorithms is that they attempt to account for variations in scale and alignment of features in the image to identify known features (in this case, the features of the test card class).

In other embodiments, the template matching subsystem 410 compares the image to multiple templates, each corresponding to different class of test cards (e.g., there might be a template for each of TOX/SEE™ urine testing panels, GEENIUS™ HIV test kits, and ID-SYSTEM™ gel cards). In one such embodiment, the template matching subsystem 410 generates a degree of match for each template and selects the test card class corresponding to closest match. In another embodiment, at least some circumstances (e.g., where two or more templates result in a degree of match within a threshold of each other) cause the template matching subsystem 410 to present a list of possible matches to the user for selection.

The image processing subsystem 420 receives the image and corresponding matching data (or a subset thereof) that indicates areas of interest that are predicted to correspond to the features defined in the template. In various embodiments, the image processing subsystem 420 determines one or more transforms to apply to the image based on the matching data. Examples of such transforms include cropping, brightness adjustment, contrast adjustment, resizing, rotation, and skew correction. By applying these transforms, the image processing subsystem 420 produces a rectified image that approximates what a photograph of the test card would look like if taken in hypothetical ideal conditions (e.g., at a fixed distance, with uniform illumination, perfectly in focus, and with the camera axis aligned with the normal of the plane of the test card). For example, if the test card class includes four identical boxes in a vertical line, the appearance of these boxes in the image can be used to estimate the required rotation (based on the angle between the centers of the boxes and an edge of the image), skew correction (based on the angles between sides of the boxes resulting from the perspective effect), and resizing (based on the size of the boxes).

In some embodiments, an iterative algorithm, such as Random Sample Consensus (RANSAC), is used to identify the combination of geometrical transforms which best explains the difference between feature locations in the template image and the corresponding locations in the input image. One advantage of RANSAC is that it is robust to outliers. Thus, the feature set generated by the template matching subsystem 410 need not be perfect to produce a reliable fit. In one embodiment, the output of the algorithm includes a metric indicating the quality of the rectified image (e.g., how likely it is to accurately reproduce the original test card with sufficient precision to generate accurate results). If the quality of the rectified image is below a threshold, the image is rejected and the user notified that the analysis failed (e.g., enabling the user to submit a new image). Alternatively, a notification can be sent to the camera 310, which captures a new image automatically. This process can be looped until an image of sufficient quality has been received or an exit condition is reached, such as a certain number of failed attempts, the user selecting a "stop" option, or an image having a quality metric below a second threshold (indicating that the user has stopped pointing the camera at a test card).

In some embodiments, the image transformation does not alter the underlying pixel values. Instead, the image is rotated, resized, and/or skewed by altering the geometric coordinates of the pixels. For example, if a given test card has two lines separated by an inch, and the input image has two lines determined to match these features that are separated by a number of pixels that correspond to half an inch, the image processing subsystem might alter the coordinates of the pixels to double the spacing between each. Thus, the rectified image will have the two lines separated by an inch, as expected from the template. One of skill in the art will appreciate how the coordinates of pixels can be changed to implement various image transforms.

Assuming the rectified image is of sufficient quality, the test identification subsystem 430 analyzes it to identify which test or tests have results on the card. In one embodiment, the test identification subsystem 430 uses a support vector machine (e.g., LIBSVM or OpenCV) to identify which test or tests have results on the test card. The support vector machine is a machine learning model that has been trained under human supervision to classify input images. For example, if a first region of the test card can have any one of a set of test identifiers (e.g., strings of characters, symbols, etc.), the support vector machine (once trained) can distinguish between tests based on which identifier is found in the first region. In this example, the portion of the rectified image that corresponds to the first region of the test card might be passed to the support vector machine (rather than the whole rectified image), which then determines which test was conducted. One of skill in the art will recognize that a wide range of indicators can be used by the support vector machine to determine which test or tests have results on the test card.

The result identification subsystem 440 identifies the result of the test or tests identified by the test identification subsystem 430. In one embodiment, because the test cards in a class have a substantially uniform format and the image has been rectified, the location of a test identifier also provides the location of the corresponding result. For example, if a test card includes adjacent boxes for the test identifier and test result, the result for a particular identified test (as determined by the test identification subsystem 430) can be found by analyzing the adjacent box. A support vector machine can again be used to determine the result by analyzing the corresponding portion of the corresponding image.

One of skill in the art will appreciate that different tests will have different result indicators. Thus, once the particular test has been identified (e.g., by the test identification subsystem 430), this information can be used to aid the analysis performed by the result identification subsystem 440. For example, the result region of the test card might include a particular shape for a negative result (e.g., a single line, a cross, an empty circle, etc.) and a different shape for a positive result (e.g., a pair of lines, a cross, a filled circle, etc.). Similarly, for tests that produce a numeric output, the result region might contain a number (e.g., a cholesterol level, antibody count, etc.). Consequently, the result identification subsystem 440 need only consider those results that the identified test might produce.

In some embodiments, the result identification subsystem 440 also produces a degree of certainty for the identified result. In one such embodiment, if the certainty is below a threshold, the result is discarded. Additionally or alternatively, results are returned to the mobile device 120 along with the indication of certainty for presentation to the user. Thus, the user can make an informed decision regarding reliability of the result and decide whether another photograph should be taken.

The template store 450 includes one or more computer-readable storage media that store the templates used by the template matching subsystem 410. Because the templates are used independently to identify test cards in a particular class, the system can be expanded for use with new classes of test cards by adding a corresponding template to the template store 450. In one embodiment, the template store 450 is a hard drive within the diagnostic server 130. In other embodiments, the template store 450 is located elsewhere, such as at a cloud storage facility accessible via the network 170.

The results store 460 includes one or more computer-readable storage media that store the results generated by the image processing subsystem 420 (e.g., processed portions of images), the result identification subsystem 440 (e.g., the result of a diagnostic test, which is added to a patient's file), or both. In one embodiment, the results store 460 is a hard drive within the diagnostic server 130. In other embodiments, the results store 460 is located elsewhere, such as at a cloud storage facility accessible via the network 170. One of skill in the art will recognize that various security precautions such as encryption and access control may be used to protect patient privacy and ensure compliance with local laws and regulations.

Example Methods

Figure 5:
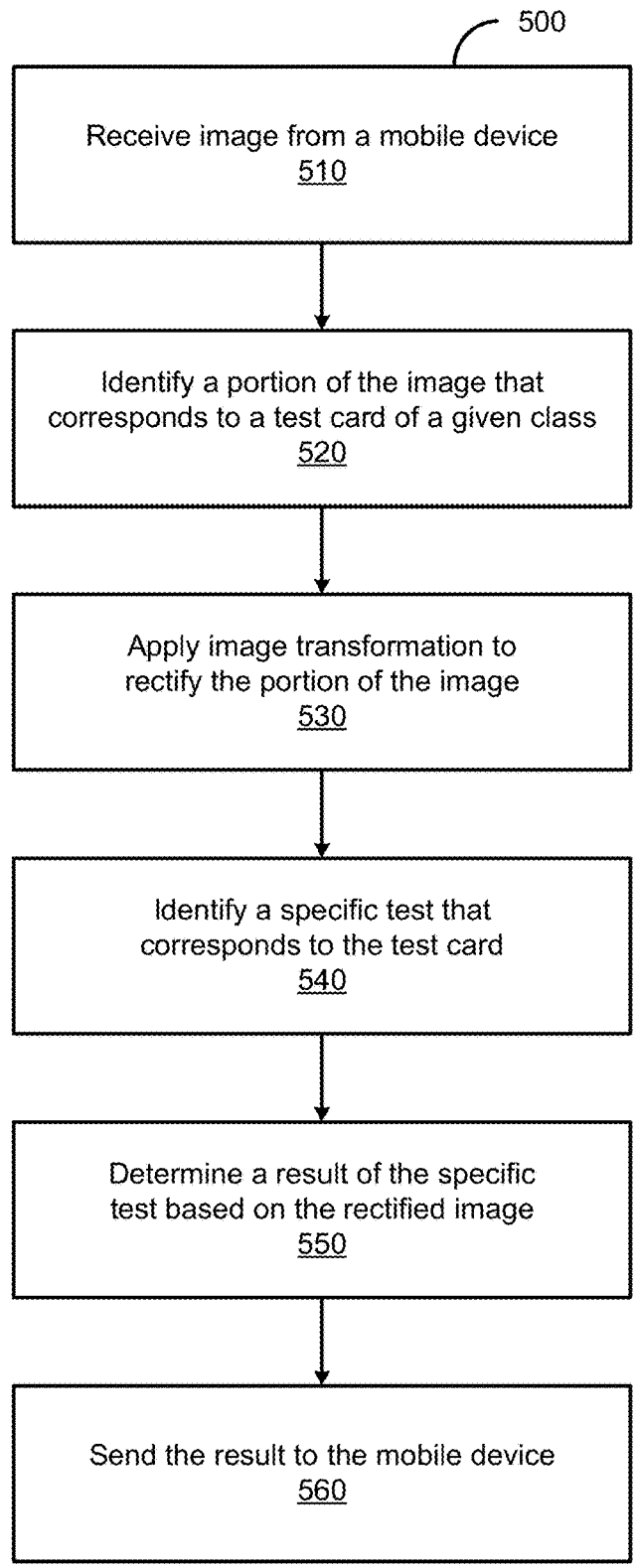
FIG. 5 is a flowchart illustrating a method of providing test results using the camera of a mobile device, according to one embodiment.

FIG. 5 illustrates one embodiment of a method 500 of providing test results using the camera 310 of a mobile device 120. FIG. 5 attributes the steps of the method 500 to the diagnostic server 130. However, some or all of the steps may be performed by other entities. In addition, some embodiments may perform the steps in parallel, perform the steps in different orders, or perform different steps. For example, some or all of the method may be performed by the mobile device 120.

In the embodiment shown in FIG. 5, the method 500 begins with the diagnostic server 130 receiving 510 an image. The diagnostic server then identifies 520 a portion of the image that corresponds to a test card of a given class. Note that the portion of the image can be the entire image or a subset thereof. As described previously, the class can be an expected class (e.g., one hard-coded into the diagnostic server 130), a requested class (e.g., a class indicated in a request received from a mobile device 120 that included the image), or selected from among several classes based on analysis of the image. One method for identifying 520 the portion of the image that corresponds to a test card of a given class is described in greater detail below, with reference to FIG. 6.

Referring back to FIG. 5, the diagnostic server 130 applies 530 an image transformation (or image transformations) to rectify the portion of the image. As described previously, in one embodiment, the image transformation produces a rectified image that approximates a photograph of the test card taken in hypothetical ideal conditions (e.g., at a fixed distance, with uniform illumination, perfectly in focus, and with the camera axis aligned with the normal of the plane of the test card). One method for applying 530 the image transformation is described in greater detail below, with reference to FIG. 7.

Referring again to FIG. 5, the diagnostic server 130 identifies 540 a specific test (or specific tests) that correspond to the test card. In various embodiments, the diagnostic server 130 uses a support vector machine to identify 540 which test (or tests) the test card includes results for based on indicia (or other features) found at certain locations within the rectified image. The support vector machine analyzes the portions of the rectified image that correspond to locations on the test card that indicate which test or tests were consulted. For example, a simple test card might include a column on the left hand side in which any tests conducted are indicated by a set of characters. Thus, the support vector machine can analyze the portion of the rectified image that shows the column and identify the conducted tests based on the characters present at that location. In one embodiment, the diagnostic server 130 calculates a confidence for each test identification, and any identification below a threshold confidence is flagged for further action (e.g., reporting as a failure to the user, presenting to the user for manual confirmation, stored for use in calculating a certainty in the final output of test results, etc.).

Once a specific test has been identified 540, the diagnostic server 130 determines 550 a result for that test based on the rectified image. As described previously, in various embodiments, the diagnostic server 130 can identify which portion of the rectified image includes the result based on the structure of the class of test card (e.g., as indicated by the corresponding template). The support vector machine interprets whatever indicia or other markings are present in that portion of the rectified image to determine 550 the test result. In one embodiment, the diagnostic server 130 also produces a confidence level for the result. The confidence level can be based on one or more of: a degree of similarity between the portion of the rectified image and the expected indicator of the result; the confidence with which the test was identified 540; and the degree to which the features identified in the original image matched the template.

The diagnostic server 130 sends 560 the result to the mobile device 120. In one embodiment, the mobile device 120 presents the result to the user on its display 330. In other embodiments, the diagnostic server 130 also sends the calculated confidence level to the mobile device 120. In one such embodiment, the mobile device displays the result and the corresponding confidence level on the display 330. Thus, if the user decides the confidence level is inadequate, the user can capture a new image and provide it for analysis in an attempt to achieve greater certainty. In another such embodiment, the mobile device 120 provides controls that enable the user to select a minimum confidence level, and if the confidence level of the result is below this threshold, an error message (e.g., "the test card could not be read, please try again") is displayed. One of skill in the art will recognize various ways in which the result can be processed and displayed at the mobile device 120.

Figure 6:
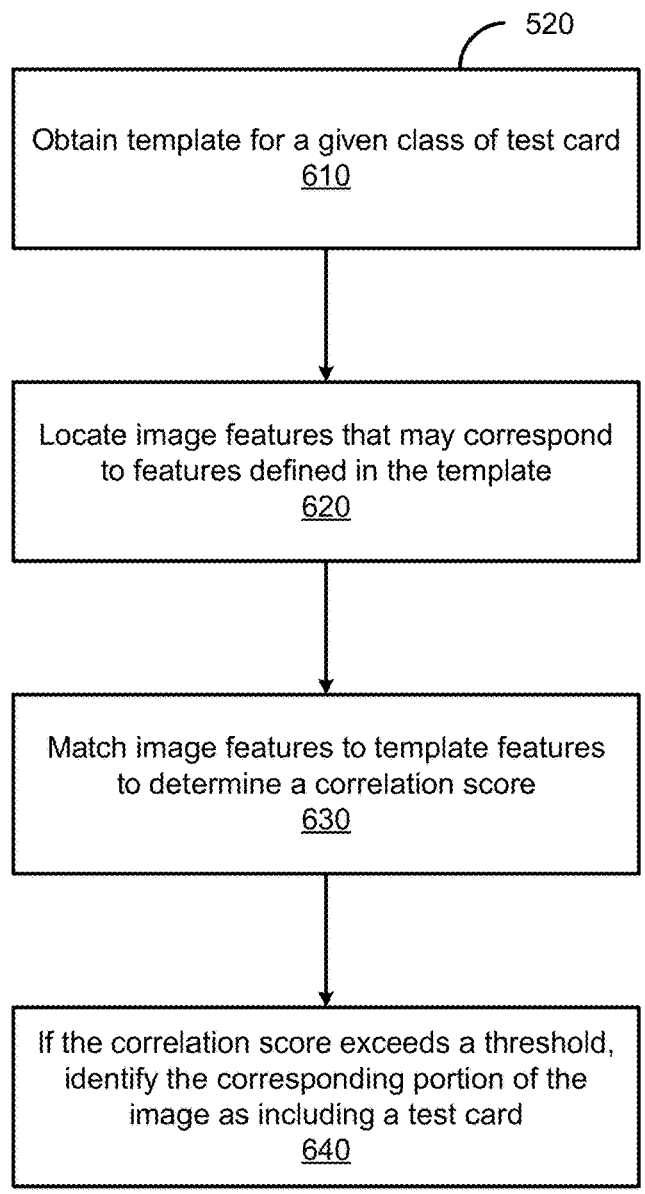
FIG. 6 is a flowchart illustrating a method of identifying a portion of an image that includes a test card, according to one embodiment.

FIG. 6 illustrates one embodiment of a method 520 of identifying a portion of an input image that includes a test card (e.g., as part of the method 500 shown in FIG. 5). FIG. 6 attributes the steps of the method 520 to the template matching subsystem 410. However, some or all of the steps may be performed by other entities. In addition, some embodiments may perform the steps in parallel, perform the steps in different orders, or perform different steps.

In the embodiment shown in FIG. 6, the method 520 begins with the template matching subsystem 410 obtaining 610 a template for a given class of test card (e.g., by loading the template from the template store 450). As described previously, the class of test card can be hard-coded in the template matching subsystem 410 or set as a parameter (e.g., selected by the user of the mobile device 120 that provided the image). In embodiments where more than one template is considered, each is obtained 610 either sequentially or in parallel. Thus, the method 520 might be applied to each template with the best match (e.g., the one with the highest probability) being selected for further processing.

The template matching subsystem 410 locates 620 features in the in the input image that might correspond to features defined in the template. For example, if the template indicates that the test card class includes a series of boxes for test identifiers and results, the template matching subsystem 410 might identify any four-sided shape in the input image as a potentially matching feature. In various embodiments, the template matching subsystem 410 extracts a feature vector for every point in the input image and compares that feature vector to feature vectors for regions or points of interest identified the template. If a feature vector extracted from the input image matches one from the templates, the corresponding location in the input image is provisionally determined to be an instance of the region or point of interest defined by the template. Thus, the template matching subsystem 410 generates a set of pairs of locations in the image and corresponding regions or points of interest defined in the template. In one embodiment, this analysis is performed on the spatial derivative of the input image. This effectively identifies the boundaries between regions of different colors or intensities (e.g., the edges of objects). Thus, the analysis is robust to variations in brightness, color balance, and the like in the input image, because it focuses on the outlines of depicted objects, not the depictions of the objects themselves.

The template matching subsystem 410 matches 630 the features in the input image to the features in the template to determine a correlation score. The correlation score indicates the likelihood that input image includes a test card of the class corresponding to the template. In various embodiments, the template matching subsystem 410 first determines whether there is a possible mapping between features in the image and every feature in the template that does not require any feature in the image to be used twice. The template matching subsystem 410 then determines whether the geometric arrangement of the features in the image is consistent with the template.

For example, if the template includes three uniformly sized boxes that are adjacent to each other, and the only box-like features in the image form a triangle and are a significant distance apart, the probability of a genuine match (and thus the correlation score) is low. In contrast, in the image includes three box-like features that are aligned, and the only differences between these features and the template are that the sizes are non-uniform and they a trapezoid rather than boxes, then the correlation score will be high (as this likely corresponds to the test card being at an angle to the camera and is easily accounted for). In one embodiment, the correlation score is determined by applying the RANSAC algorithm, using the parameters of the possible image transforms (e.g., resize, skew, and rotation) as variables. Because RANSAC is robust to outlier values, even if several of the identified pairs of image locations and regions/points of interest are false positives, the algorithm will still converge on a set of transformation parameters with a high probability of match. For example, even where the match between an individual feature in the template and a portion of the input image might be uncertain, the correlation score for the whole set can still be sufficiently high to justify reliance on it in reading a test card. One of skill in the art may recognize other ways to determine correlation scores.

In various embodiments, regardless of the specific manner in which it is determined, if the correlation score exceeds a threshold, the template matching subsystem 410 identifies 640 the corresponding portion of the image as including a test card. For example, in one embodiment, the correlation score is determined using a high-pass filtered version of the image. Thus, only edges contribute to the correlation score, with uniform areas being ignored. As a result, the correlation score rapidly drops towards zero when the input image and template are misaligned. Consequently, a relatively low correlation score (e.g., 0.25) may be used as the threshold and still reliably distinguish between matches and non-matches. In some embodiments, markings that are unrelated to specific results (e.g., manufacturer or provider logos) are used as an additional validation check. Once a potential match has been identified (e.g., the correlation score exceeds the threshold) the logo is looked for at the location it would be if the match is a true match. A secondary correlation score can be determined for the logo by comparing the region of the image where the logo is expected to be found with a template for the logo in a similar manner that the input image is compared to a template for an entire test card. If the logo is found at the expected location, the match is confirmed. If it is not, the potential match is rejected. One of skill in the art may recognize other ways in which the presence of a logo in an expected position can be determined.

In other embodiments, the degree of the match is presented to the user (e.g., by sending a message back to the mobile device 120), who can request the analysis proceed or provide a new image. In yet further embodiments, other approaches are used. For example, a match above a first threshold might be automatically accepted, while a match between the first threshold and a second threshold might be presented to the user for confirmation, while matches below the second threshold are automatically rejected and the user informed no match was found.

Figure 7:
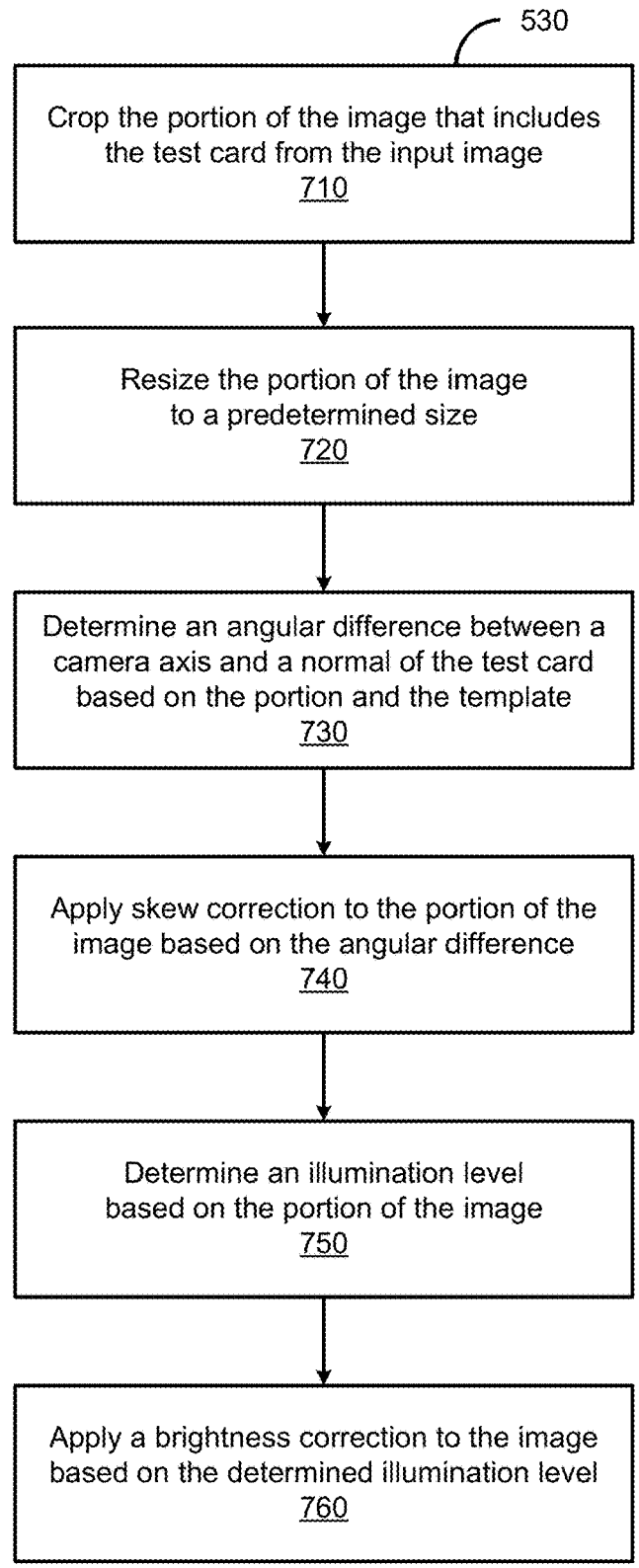
FIG. 7 is a flowchart illustrating a method of applying image transformation to aid in test result identification, according to one embodiment.

FIG. 7 illustrates one embodiment of a method 530 of applying image transformation to aid in test result identification (e.g., as part of the method 500 shown in FIG. 5). FIG. 7 attributes the steps of the method 530 to the image processing subsystem 420. However, some or all of the steps may be performed by other entities. In addition, some embodiments may perform the steps in parallel, perform the steps in different orders, or perform different steps. For example, some embodiments correct for skew and/or illumination level before cropping the image. As another example, some embodiments omit the cropping and resizing steps.

In the embodiment shown in FIG. 7, the method 530 begins with the image processing subsystem 420 cropping the portion of the image that includes a test card (e.g., as determined by the template matching subsystem 410) from the input image. In various embodiment, the image processing subsystem 420 crops 710 the input image such that the remainder is of a fixed shape (e.g., a square, a rectangle with a pre-determined ratio between side lengths, or the like) without removing any part of the input image that corresponds to the test card. In one such embodiment, the image processing subsystem 420 removes as much of the input image as possible without removing any part that correspond (or may correspond) to the test card. In other embodiments, the image processing subsystem 420 leaves a minimum width of border that it determines is not the test card. Regardless of the precise approach used for cropping 710, the image processing subsystem 420 resizes 720 the remaining portion of the image to a predetermined size. One of skill in the art will recognize other ways in which the input image can be cropped and resized.

In various embodiments, the cropping and resizing of input images enables the diagnostic server 130 to account for differences in the distance between a camera used to capture the image and the test card without substantially impacting the reliability of results read from the test card. In one embodiment, images captured at a distance between five centimeters and thirty centimeters can be used without substantially impacting reliability. In another embodiment, images captured at distances between five centimeters and twenty centimeters can be used without a substantial impact on reliability. In other embodiments, other ranges of distances can be used without a substantial impact on reliability, depending on the properties of the camera.

The image processing subsystem 420 determines 730 an angular difference between the focal axis of the camera used to capture the image and the normal to the plane of the test card. In one embodiment, the image processing subsystem 420 compares the potential features identified in the image to a test card template to determine 730 the angular difference. For example, the extent to which lines that are parallel or perpendicular on the test card appear to converge in the image can be used to determine the angular difference. As another example, the relative size of features on the test card and the size at which those features appear in the image may also be used to determine 730 the angular difference.

Having determined 730 the angular difference, the image processing subsystem 420 applies 740 a skew correction to the image. In some embodiments, image processing subsystem 420 determines an amount of skew correction to apply 740 to compensate for the angular difference. In other words, after the skew is corrected, the image will approximate what it would have looked like had the angular difference been zero (i.e., if the camera was pointed directly at the test card). In one embodiment, the image processing subsystem 420 can correct for an angular difference of up to forty-five degrees without substantially compromising the reliability of the results read from the test card. In another embodiment, angular differences of up to twenty degrees can be corrected without a substantial impact on reliability. In other embodiments, other ranges of angular difference can be corrected for without substantially impacting reliability.

The image processing subsystem 420 also determines 750 an illumination level based on the image. In one embodiment, the image processing subsystem calculates the average intensity of each pixel in the image to determine 750 the overall illumination level. The image processing subsystem 420 then applies 760 a brightness correction to normalize the image to a standard brightness. In a related embodiment, the image processing subsystem 420 also applies a contrast adjustment to the image. For example, where the illumination level is low, increasing the contrast of the image may help to distinguish features of interest from the background of the test card.

Thus, the embodiment of the method 530 shown in FIG. 7 produces a rectified image of the test card with a standard set of properties. This makes identifying the specific tests and corresponding results on the test card easier, increasing the reliability of the read results.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as subsystems, without loss of generality.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and process for reading test cards using a mobile device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

What is claimed is:

1. A computing device for interpreting test cards, the device comprising:
    a template matching subsystem configured to receive an input image from a mobile device and determine that a portion of the input image corresponds to a test card, the test card having a class of a plurality of test card classes, wherein each class of test card is defined by a particular layout of features, the particular layouts of the classes of test card being different from each other, and wherein the template matching subsystem is further configured to identify the class of the test card in the input image by matching potential features in the input image to templates describing the particular layouts of each of the plurality of test card classes;
    an image processing subsystem, operably connected to the template matching subsystem, configured to apply an image transformation to rectify the portion of the input image that corresponds to the test card;
    a test identification subsystem configured to identify a test type for which the test card includes a test result, where a test type corresponds to a plurality of possible result indicators for tests of the test type, wherein the test type is identified based on the identified test card class and the rectified portion of the input image; and
    a result identification subsystem configured to determine the test result included on the test card based on the rectified portion of the input image and the possible result indicators corresponding to the identified test type.

2. The computing device of claim 1, wherein determining that the portion of the input image corresponds to the test card comprises:
    identifying the plurality of potential features in the input images;
    comparing the plurality of potential features to a template for a particular test card class to determine a correlation score; and
    determining that the portion of the input image corresponds to the particular test card class responsive to the correlation score exceeding a threshold.

3. The computing device of claim 1, wherein determining that the portion of the input image corresponds to the test card comprises:
    identifying the plurality of potential features in the input images;
    comparing the plurality of potential features to each of the templates to generate corresponding correlation scores;
    selecting a first template of the plurality of templates, the first template corresponding to a first class of test card and having a highest correlation score; and
    determining that the portion of the input image corresponds to a test card of the first class.

4. The computing device of claim 1, wherein the image transformation includes at least one of: cropping the input image, applying a skew correction to the input image, and resizing the input image.

5. The computing device of claim 1, wherein an angle between a focal axis of a camera that captured the input image and the normal to a plane of the test card can be in a range from zero degrees to forty five degrees without substantially impacting a reliability of the identified result.

6. The computing device of claim 1, wherein a distance between the camera that captured the input image and the test card can be in a range from five centimeters to thirty centimeters without substantially impacting a reliability of the identified result.

7. The computing device of claim 1, wherein the input image is captured by a camera of the mobile device, the test card is physically separate from the camera at a time the image is captured, and the test card is not supported by an attachment connected to the mobile device.

8. The computing device of claim 1, wherein the test identification subsystem identifies the specific test by providing at least a portion of the rectified image to a support vector machine, the support vector machine having been trained to identify the specific test from among a plurality of possible tests.

9. The computing device of claim 1, wherein the result identification subsystem identifies the result of the specific test by providing at least a portion of the rectified image and the plurality of possible result indicators of the test type to a support vector machine, the support vector machine having been trained to identify the test result from among a plurality of possible results.

10. A method of interpreting test cards, the method comprising:
receiving an input image from a mobile device;
determining that a portion of the input image corresponds to a test card, the test card having a class of a plurality of test card classes, wherein each class of test card is defined by a particular layout of features, the particular layouts of the classes of test card being different from each other, and wherein the template matching subsystem is further configured to identify the class of the test card in the input image by matching potential features in the input image to templates describing the particular layouts of each of the plurality of test card classes;
applying an image transformation to the portion of the input image, the image transformation rectifying the portion of the input image;
identifying a test type for which the test card includes a test result, where a test type corresponds to a plurality of possible result indicators for tests of the test type, wherein the test type is identified based on the identified test card class and the rectified portion of the input image; and
determining the test result included on the test card based on the rectified portion of the input image and the possible result indicators corresponding to the identified test type.

11. The method of claim 10, wherein determining that the portion of the input image corresponds to the test card comprises:
identifying the plurality of potential features in the input images;
comparing the plurality of potential features to a template for a particular test card class to determine a correlation score; and
determining that the portion of the input image corresponds to the particular test card class responsive to the correlation score exceeding a threshold.

12. The method of claim 10, wherein determining that the portion of the input image corresponds to the test card comprises:
identifying the plurality of potential features in the input images;
comparing the plurality of potential features to each of the templates to generate corresponding correlation scores;
selecting a first template of the plurality of templates, the first template corresponding to a first class of test card and having a highest correlation score; and
determining that the portion of the input image corresponds to a test card of the first class.

13. The method of claim 10, wherein the image transformation includes at least one of: cropping the input image, applying a skew correction to the input image, and resizing the input image.

14. The method of claim 10, wherein an angle between a focal axis of a camera that captured the input image and the normal to a plane of the test card can be in a range from zero degrees to forty five degrees without substantially impacting a reliability of the identified result.

15. The method of claim 10, wherein a distance between the camera that captured the input image and the test card can be in a range from five centimeters to thirty centimeters without substantially impacting a reliability of the identified result.

16. The method of claim 10, wherein the input image is captured by a camera of the mobile device, the test card is physically separate from the camera at a time the image is captured, and the test card is not supported by an attachment connected to the mobile device.

17. The method of claim 10, wherein the test identification subsystem identifies the specific test by providing at least a portion of the rectified image to a support vector machine, the support vector machine having been trained to identify the specific test from among a plurality of possible tests.

18. The method of claim 10, wherein the result identification subsystem identifies the result of the specific test by providing at least a portion of the rectified image and the plurality of possible result indicators of the test type to a support vector machine, the support vector machine having been trained to identify the test result from among a plurality of possible results.

19. A system for reading test cards, the system comprising:
a mobile device having a camera and a display, the camera configured to obtain an image including a test card, the test card having a class of a plurality of test card classes, wherein each class of test card is defined by a particular layout of features, the particular layouts of the classes of test card being different from each other, and wherein the template matching subsystem is further configured to identify the class of the test card in the input image by matching potential features in the input image to templates describing the particular layouts of each of the plurality of test card classes, the test card being physically separate from the camera at a time the image is captured and not supported by an attachment connected to the mobile device, and the display configured to display the test result determined from the image; and
a diagnostic server, communicably coupled to the mobile device, and configured to:
receive the image from the mobile device;
apply an image transformation to the image, the image transformation rectifying the image;
determine a test type for which the test card includes a test result, where a test type corresponds to a plurality of possible result indicators for tests of the test type, wherein the test type is identified based on the identified test card class and the rectified image;
determine the test result included on the test card based on the rectified image and the possible result indicators corresponding to the identified test type; and
send the result to the mobile device.

20. The system of claim 19, wherein the diagnostic server determines the test result by using a support vector machine to identify a test type from a plurality of possible test types and identify the result from a plurality of possible results for the test type.

21. The method of claim 1, wherein the plurality of possible result indicators includes a first shape indicating a positive result and a second shape indicating a negative result.

22. The method of claim 21, wherein the first shape includes at least one of a line, a cross, or an empty circle, and the second shape includes at least one of a pair of lines, a cross, or a filled circle.

23. The method of claim 1, wherein the plurality of possible result indicators includes numeric values.

\* \* \* \* \*